United States Patent
Lim et al.

(10) Patent No.: US 8,659,993 B2
(45) Date of Patent: Feb. 25, 2014

(54) PRIORITY DOMAINS FOR PROTECTION SWITCHING PROCESSES

(75) Inventors: Arnel Lim, San Jose, CA (US); Hanno Viehweger, Berlin (DE)

(73) Assignee: Extreme Networks, Inc., Santa Clara, CA (US)

( * ) Notice: Subject to any disclaimer, the term of this patent is extended or adjusted under 35 U.S.C. 154(b) by 67 days.

(21) Appl. No.: 13/464,418

(22) Filed: May 4, 2012

(65) Prior Publication Data

US 2013/0294226 A1     Nov. 7, 2013

(51) Int. Cl.
    *H04J 1/16*     (2006.01)

(52) U.S. Cl.
    USPC ......................... 370/216; 370/395.42; 370/222

(58) Field of Classification Search
    USPC ............... 370/216, 222, 242, 245, 248, 258, 370/395.42
    See application file for complete search history.

(56) References Cited

U.S. PATENT DOCUMENTS

| | | | |
|---|---|---|---|
| 7,003,705 B1 * | 2/2006 | Yip et al. | 714/717 |
| 7,944,815 B2 * | 5/2011 | Thomson et al. | 370/222 |
| 8,107,383 B2 * | 1/2012 | Kashyap et al. | 370/245 |

* cited by examiner

*Primary Examiner* — Brenda H Pham
(74) *Attorney, Agent, or Firm* — Blakely, Sokoloff, Taylor & Zafman

(57) ABSTRACT

Embodiments of the invention describe apparatus, systems and methods for creating a protection switching domain having a control virtual local area network (vlan), a first set of high priority protected data vlans, and a second set of lower priority protected data vlans. When a fault is detected at a ring network, indicating a failed link between adjacent nodes, said fault is communicated to a master node of the ring network via the control vlan.

Embodiments of the invention allow a user to specify a priority for each of its domains on a given set of ring ports. The higher priority protected data domains are serviced to completion prior to servicing the lower priority protected data domains, ensuring that data traffic convergence time does not increase across these vlans.

18 Claims, 4 Drawing Sheets

PRIORITY DOMAINS FOR PROTECTION SWITCHING PROCESSES

FIELD

Embodiments of the invention relate to computer networking, and more particularly to establishing priority domains for protection switching processes.

BACKGROUND

Bridged, layer-2 networks, such as Ethernet networks, provide services to areas where fiber optic lines do not extend and generally provide high data capacity at a low cost. A problem with bus and ring networks like the Ethernet is the possibility of a single point of failure causing the system to breakdown. A common solution is to design the network with redundant segments and loops so that there is more than one route to each node in a Synchronous Optical NETwork (SONET)-like approach (i.e., a layer-1 network). Redundancy and loops can, however, present another problem in which a broadcast packet or an unknown unicast packet results in a broadcast storm where each node receives and rebroadcasts the packet, causing potentially severe network congestion.

Current solutions for preventing single points of failures in ring networks, such as Ethernet Automatic Protection Switching (EAPS) systems, utilize an EAPS domain having a control virtual local area network (vlan) and at least one protected data vlan. The EAPS domain is associated with a master node linked to at least one transit node in a ring network.

An EAPS system operates in conjunction with the master node to detect a network failure by means of control messages sent between the nodes using the control vlan. During normal operation, the master node blocks the protected data vlan traffic from traversing its secondary port. During a network failure, the master node reroutes the protected data vlan traffic through its secondary port. When the network is restored, the EAPS system operates in conjunction with the affected transit node to prevent looping by blocking the protected data vlan traffic from traversing its restored ring port until notified by the master node that normal operation has resumed.

Current solutions, however, encounter scaling issues with respect to the number of protected vlans. For EAPS solutions, as the number of protected vlans increase, data traffic convergence time also increases across all vlans. This is because EAPS processes the protected vlans sequentially. What is needed is an adaptable process for selecting which vlans should be serviced first.

SUMMARY OF THE INVENTION

Embodiments of the invention describe apparatus, systems and methods for creating a protection switching domain having a control virtual local area network (vlan), a first set of high priority protected data vlans, and a second set of lower priority protected data vlans. Some embodiments of the invention may utilize more than two sets of protected data vlans. When a fault is detected at a ring network, indicating a failed link between adjacent nodes, said fault is communicated to a master node of the ring network via the control vlan.

For the protected data vlans of the first set, the master node's secondary port is unblocked to traffic of at least one data vlan of the first set. A state of the ring network for the first set of data vlans is set to failed, and a forwarding database is flushed on the master node and on the at least one transit node. The state of the ring network for the first set of data vlans is then set to complete when the ring network is unbroken or the ring network has been restored and all nodes are communicating correctly.

For the protected data vlans of the second set, domain events of the data vlans are queued until the state of the ring network for the first set of data vlans is set to complete. Thus, embodiments of the invention allow a user to specify a priority for each of its domains on a given set of ring ports. The higher priority domains are serviced to completion prior to servicing the lower priority domains, ensuring that data traffic convergence time does not increase across these vlans.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings

DETAILED DESCRIPTION

Embodiments of an apparatus, system and method for establishing priority domains for protection switching processes are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
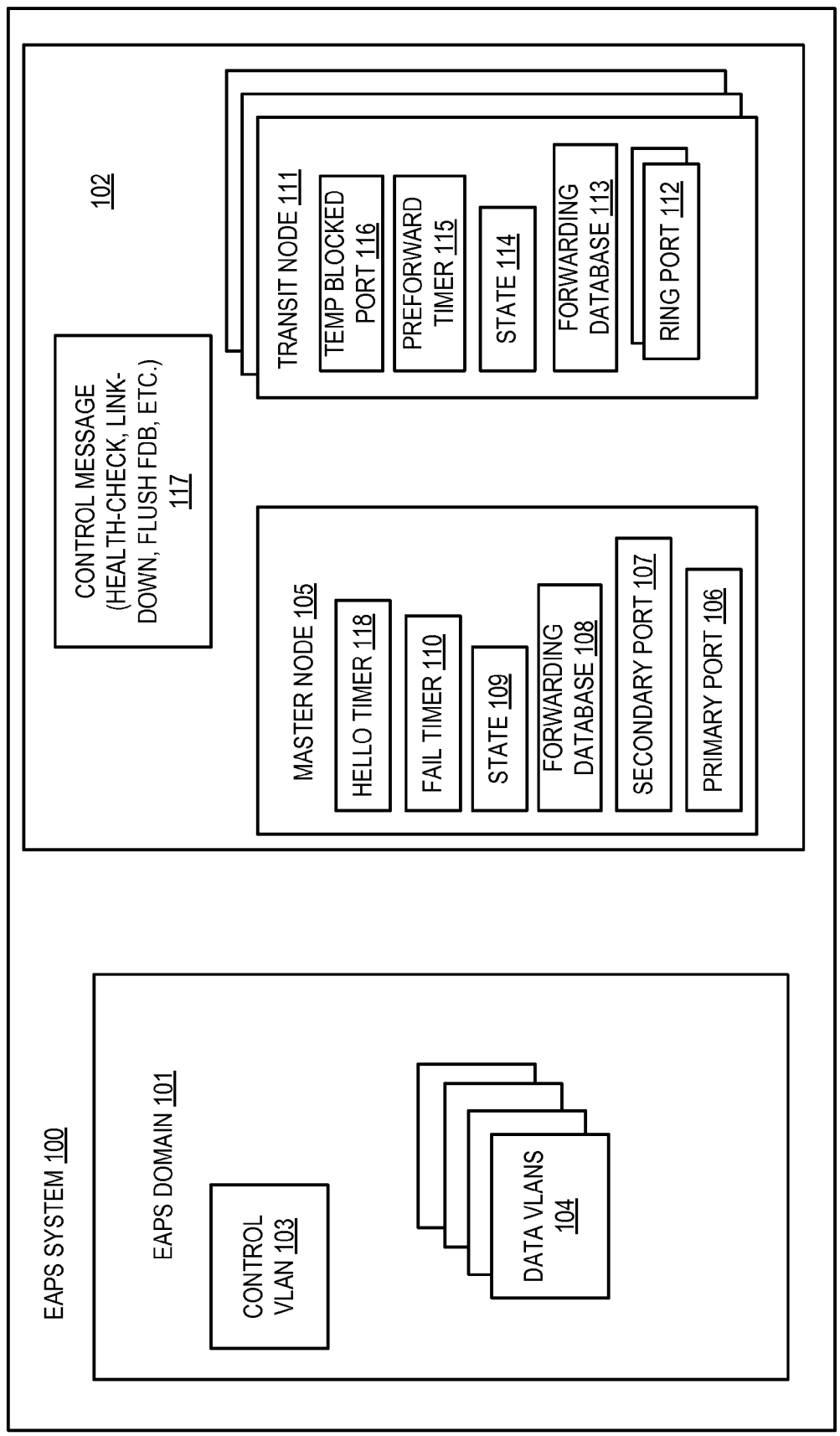
FIG. 1 is a block diagram illustrating an ethernet protection system for implementing an embodiment of the invention.

FIG. 1 is a block diagram illustrating an ethernet protection system for implementing an embodiment of the invention. System 100 includes of one or more domains 101—e.g., an Ethernet Automatic Protection Switching (EAPS) domain or an Ethernet Ring Protection Switching (ERPS) domain. In this exemplary embodiment, domain 101 is shown as an EAPS domain.

Control VLAN 103 is created for each EAPS domain for the purpose of sending and receiving EAPS system control messages 117. EAPS domain 101 is created to protect a group of one or more data carrying VLANs 104.

EAPS system 100 operates on ring network 102. One node on ring network 102 is designated as master node 105. The two ring ports on the master node 105 are designated as primary port 106 and secondary port 107. All other nodes on the ring network 102 are transit nodes 111 and each has its respective ring ports 112. Each master node 105 and transit node 111 has forwarding database (FDB), 108 and 113 respectively, in which they store information about the network communication paths. The master node 105 includes state register 109 for storing the state of ring network 102. For the purpose of illustration, the states of the ring network 102 are described as either as "failed," meaning there is a fault or break in the ring network 102, or as "complete," meaning that the ring network is unbroken or the ring network has been restored and all nodes are communicating correctly. Transit nodes 111 are shown to include state register 114, which stores the pre-forwarding state, and pre-forwarding timer 115. The transit nodes 111 also have temporarily-blocked-port storage area (TBP) 116 in which they store the identification of the port that is temporarily blocked.

Master node 105 and transit nodes 111 use control messages 117 to communicate via control VLAN 103. Some examples of control messages 117 in embodiments include, for example, health-check messages, link-down messages, and flush-FDB messages. In this embodiment, transit node 111 recognizes a message sent on control VLAN 103 as control message 117 because it has a special MAC (media access control) address that corresponds to an entry in forwarding database 113. The master node and the transit nodes forward control message 117 prior to copying it to the central processing unit (CPU) of the node where, among other things, it may be logged for use in troubleshooting.

In this embodiment, master node 105 includes hello-timer 118, which is the clock for sending health-check control messages 117. Once hello-timer 118 is started, it prompts master node 105 to send health-check message 117 on control VLAN 103 at regular intervals—for example every one second. Health-check message 117 is forwarded around ring network 102 and returns to master node 105 nearly instantaneously. When master node 105 sends health-check message 117, it sets fail-timer 110; should fail-timer 110 expire before the health-check message is returned to master node 105, the master node determines that there is a fault in ring network 102. Health-check messages 117 are sent even during a fault. When the fault is restored, master node 105 knows immediately because the return of the health-check message 117 is resumed.

In other embodiments of the invention, other methods for detecting a fault in a ring network may be utilized. For example, if a node detects a fault, it may send a link-down protocol data unit (PDU) on its other ring port; reception of a link-down PDU causes the master node to go into a failed state, and open its secondary port. When the fault is restored, nodes receive a health-check PDU to indicate that the ring network is up. Other functionally equivalent processes for detecting a fault may be used without deviating from the functionality of embodiments described herein.

Figure 2:
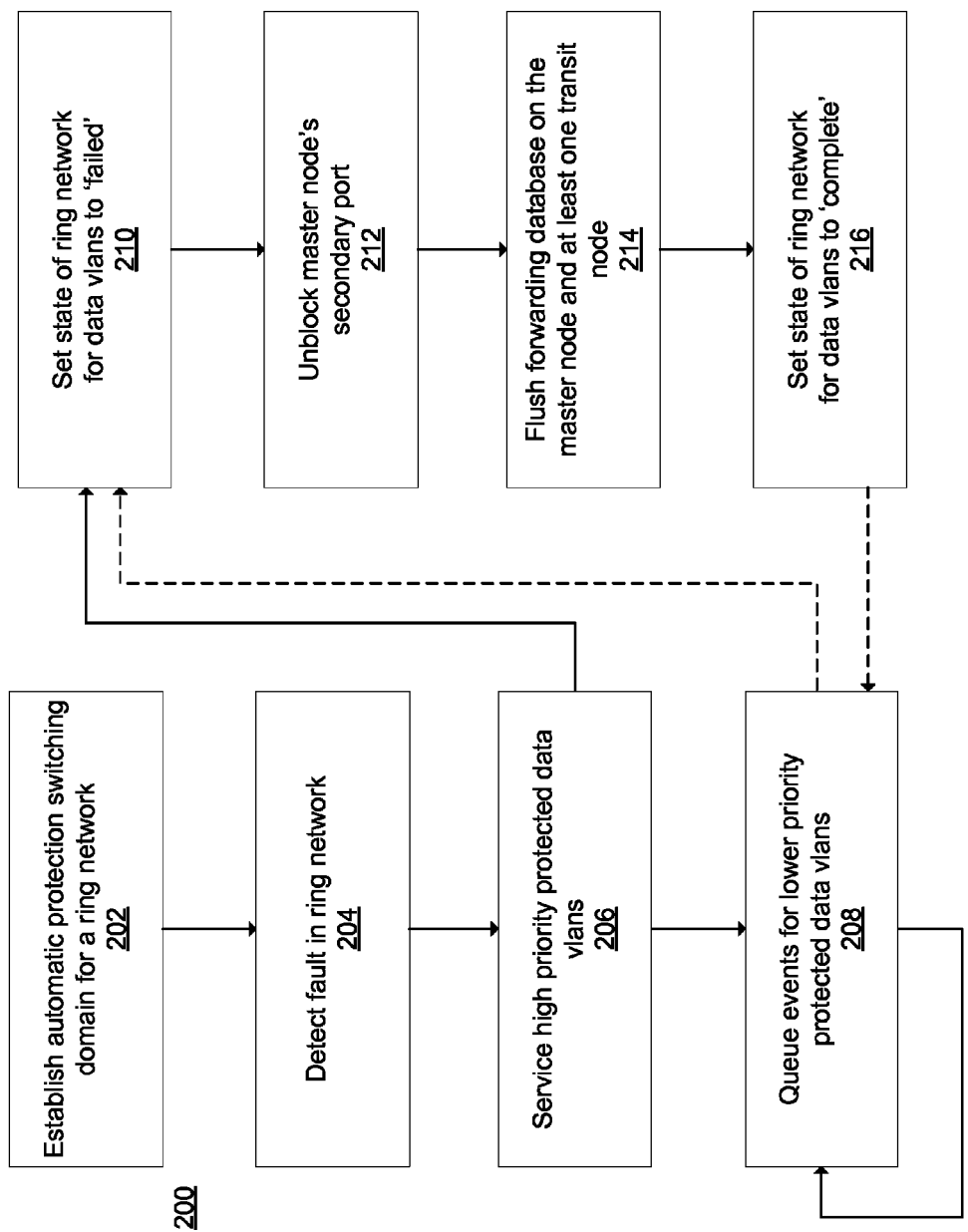
FIG. 2 is a flow diagram of a process according to an embodiment of the invention.

FIG. 2 is a flow diagram of a process according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

In this embodiment, process 200 includes operations for establishing an automatic protection switching domain for a ring network, 202. The ring network includes a control vlan, and first set of protected data vlans (e.g., a high priority set of vlans) and a second set of protected data vlans (e.g., a lower priority set of vlans). Some embodiments of the invention may utilize more than two sets of protected data vlans. The ring network is "complete" when all are communicating on the primary port.

Said ring network includes a master node and a plurality of transit nodes. During normal operation, the master node blocks protected data vlan traffic from traversing the secondary port to prevent a loop. In one embodiment, the control vlan is not blocked on the secondary port; only the protected data vlans are blocked. The ports may be blocked and unblocked using any means known in the art.

A fault is detected in the ring network, 204. When the master node detects a break in the ring, it unblocks the secondary port and allows data traffic to be transmitted and received through the secondary port. In one embodiment, the master node detects a fault in the ring network using polling or trapping via processes such EAPS. In other embodiments, the master node detects a fault in the ring network by verifying link integrity via processes, such as Connectivity Fault Management (CFM) protocols, for notifying fault handing processes such as EAPS or Ethernet Ring Protection Switching ERPS. Other functionally equivalent processes for detecting a fault may be used without deviating from the functionality of embodiments described herein.

Said fault is communicated to the master node via the control vlan. For example, in polling processes, the master node periodically sends a health-check control message via the control vlan on the primary port. The health-check control message is one of the control messages exchanged between the master node and the transit nodes. When the ring network is complete, the health-check control message is returned to the master node on its secondary port before a fail-timer expires, and the master node determines that the ring network is complete. In one embodiment, when there is a break in the ring network, the health-check control message is not returned to the master node before the fail-timer expires.

For trapping processes, the master node may receive a link-down control message from a transit node. The link-down control message is another one of the control messages exchanged between the master node and the transit nodes. When a transit node detects a fault (i.e., a break in the ring) on one of its ring ports, it may send a link-down control message to the master node via the control vlan on its good port.

In this embodiment, the control vlan services the first set of protected data vlans before servicing the second set of protected vlans, 206. "Servicing" is shown to comprise operations including unblocking the master node's secondary port to traffic of at least one data vlan of the first set, 212, when the state of the ring network for the first set of data vlans is set to "failed," 210. A forwarding database is flushed on the master node and on the at least one transit node, 214, which forces all of the nodes to relearn the new path to the layer-2 end stations via the reconfigured topology. The state of the ring network for the first set of data vlans is set to complete, 216.

For the one or more protected data vlans of the second set, domain events of the data vlans(s) of the second set are queued, 208, until the state of the ring network for the first set of data vlans is set to complete. Then a similar "servicing" process is executed for the data vlans of the second set (e.g., the lower priority set).

Thus, processes according to embodiments of the invention, such as the exemplary process described above, allow a user to specify a priority for each of its domains on a given set of ring ports. The higher priority domains are serviced to completion prior to servicing the lower priority domains, ensuring that data traffic convergence time does not increase across these vlans.

Figure 3:
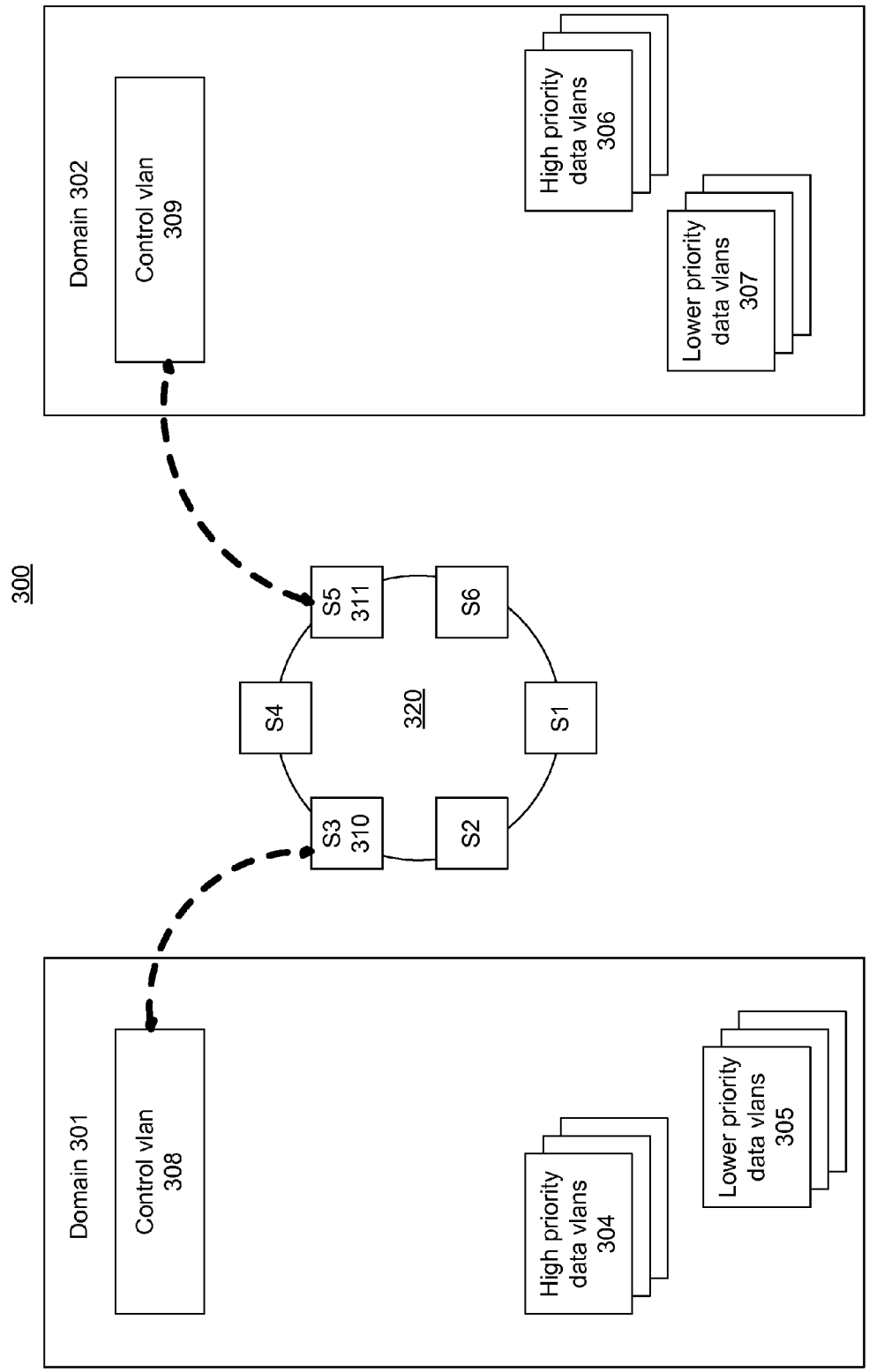
FIG. 3 is a block diagram of a network having a master node for executing a process according to an embodiment of the invention.

FIG. 3 is a block diagram of a network having a master node for executing a process according to an embodiment of the invention. Network 300 is shown to execute an EAPS protection process; however, as mentioned above, other embodiments may execute functionally equivalent protection processes, such as an ERPS process.

Network 300 includes multiple EAPS domains on ring network 320 (shown to include nodes S1-S5) to improve efficiency by enabling spatial reuse of the ring network. EAPS domains 301 and 302 responsible for protecting its own group of data vlans. In this embodiment, EAPS domain 301 includes high priority data vlans 304 and lower priority data vlans 305, while EAPS domain 302 includes high priority data vlans 306 and lower priority data vlans 307. Each EAPS domain includes a unique control vlan 308/309 and master node 310/311. In other embodiments, EAPS domains 301 and 302 can have the same master node.

Networks such as network 300 as shown may provide a user with fast L2 redundancy for ring based topologies. On each switch a user creates an EAPS domain, which specifies 2 ring ports as well as a list of all vlans a particular EAPS domain will be protecting. When a failure occurs in ring network 320, the EAPS domain spanning that ring take the necessary action to provide an alternative path for traffic to traverse. In doing this, EAPS domains 301 and 302, on a per domain basis, take action on the list of vlans protected by each EAPS domain affected by the failure.

In embodiments when data vlan sets 304/305 and 306/307 include large numbers of vlans, there is a slight delay between the time the first protected vlan recovers and the last protected vlan recovers, since processing is handled sequentially. In this embodiment, users may divide their EAPS protected vlans into two or more domains, similar to how EAPS spatial reuse is configured on the same physical ring.

As described above, priorities may be assigned to each of these EAPS domain groups. In some embodiments, high priority EAPS domains 304 and 306 contain a small subset of protected vlans, while the lower priority domain 305 and 307 contain the bulk of protected vlans. This allows the small subset of protected vlans contained in the high priority domains to get serviced first, resulting in faster, more predictable traffic convergence times for this smaller set of vlans.

Thus, embodiments of the invention allow a user to specify a priority for each of its domains on a given set of ring ports. The higher priority domains are serviced to completion prior to servicing the lower priority domains (as described, for example, by process 200 of FIG. 2). Internally within EAPS, an object called an EAPS domain group may be created that identifies a physical ring to which all domains with matching ring ports belong. The EAPS domain group is an abstraction that manages high and low priority domains for each physical ring. All domains, high and low, that have the same physical ring ports are members of the same domain group. When any of the EAPS domains of an EAPS domain group report a transition in their ring state, either "ring complete" or "ring failed," the EAPS domain group transitions to that particular state. When the EAPS domain group detects a ring transition, EAPS may begin queuing lower priority domain events. These lower priority domain events remained queued until the higher priority domains (i.e., domains 304 and 306 in this example embodiment) have completed transitioning to their new domain state. Once this occurs, lower priority events can now start processing events that cause lower priority domains (i.e., domains 305 and 307 in this example embodiment) to also transition their domain state.

Since asynchronous calls are made to hardware functions, an acknowledgement from hardware may be sent ensuring the hardware operation is completed. After the acknowledgement is received, an EAPS domain may complete its state transition. Thus, as high priority domains are in the process of transitioning due to a change in the ring state, the lower priority EAPS domains are queuing their events. As each high priority domain finishes its transition to a steady state, a message is sent to its EAPS domain group indicating that this particular domain is done transitioning. When all high priority domains within an EAPS domain group have completed their transition, the EAPS domain group gives the signal to begin processing lower priority EAPS domain events. This ensures that all EAPS protected vlans that are part of high priority domains are serviced to completion first.

Before a high priority domain can complete its transition to a steady state, it relies on messages from other nodes in the ring. This means that all nodes in a particular domain, high or low, enforce EAPS domain priorities. Full data traffic convergence on a vlan is dependent on all nodes in the ring to have completed their necessary convergence operations in the correct priority order, be it blocking or unblocking a port, or flushing its FDB table.

Figure 4:
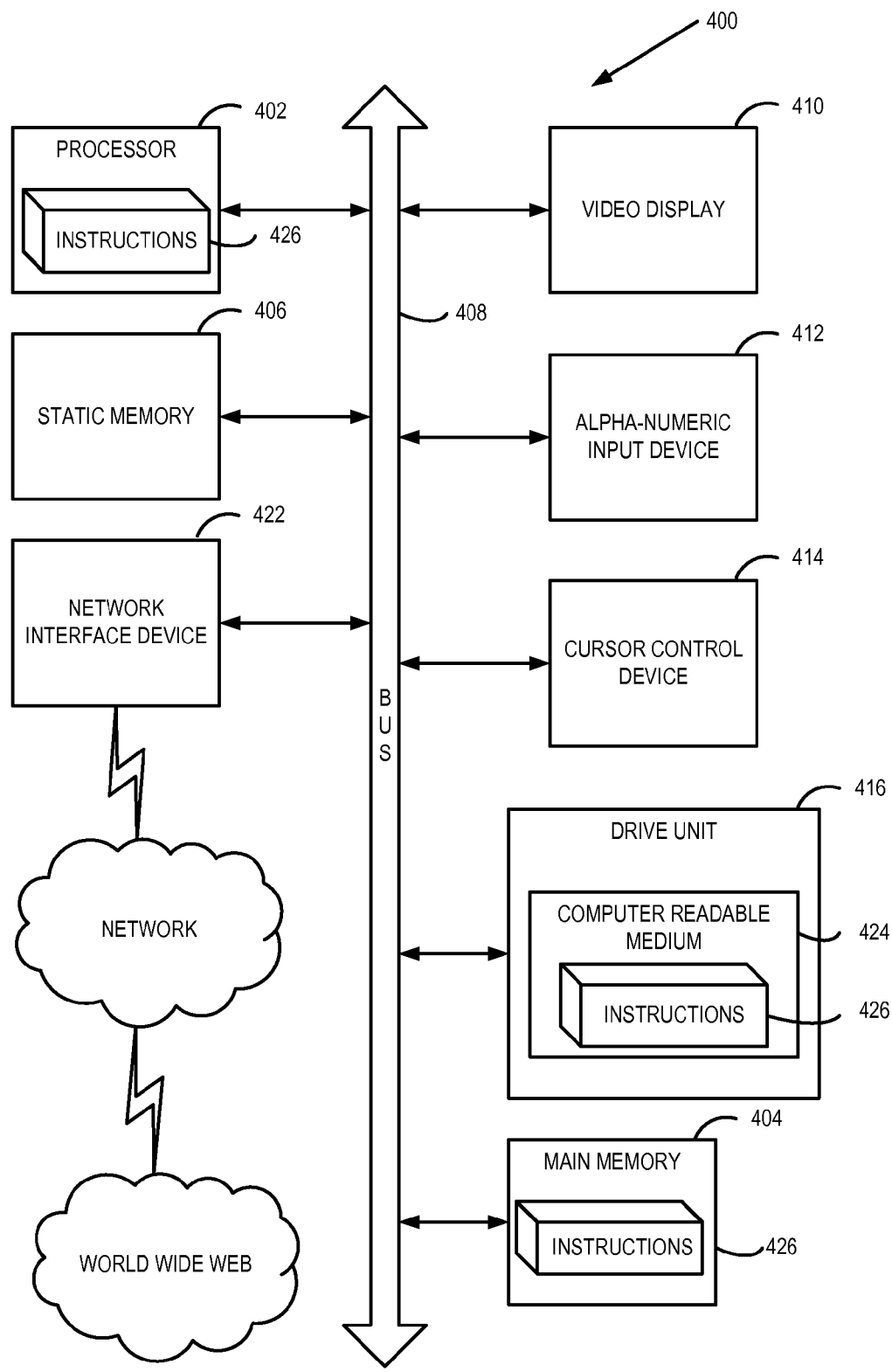
FIG. 4 illustrates a diagrammatic representation of a computer system for implementing an embodiment of the invention.

FIG. 4 illustrates a diagrammatic representation of a machine in the exemplary form of computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Exemplary computer system 400 includes processor 402, main memory 404 (e.g., read-only memory (ROM), flash memory, dynamic random access memory (DRAM) such as synchronous DRAM (SDRAM) or Rambus DRAM (RDRAM), etc.), static memory 406 (e.g., flash memory, static random access memory (SRAM), etc.), and secondary memory 418 (e.g., a data storage device), which communicate with each other via bus 408.

Processor 402 represents one or more general-purpose processing devices such as a microprocessor, central processing unit, or the like. More particularly, processor 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute processing logic/modules 426 for performing the operations such as those described by process 200 of FIG. 2.

Computer system 400 may further include network interface device 416. The computer system also may include video display unit 410 (e.g., a liquid crystal display (LCD) or a cathode ray tube (CRT)), alphanumeric input device 412 (e.g., a keyboard), and cursor control device 414 (e.g., a mouse).

Secondary memory 418 may include machine-readable storage medium (or more specifically a computer-readable storage medium) 424 on which is stored one or more sets of instructions (e.g., software 422) embodying any one or more of the methodologies or functions described herein. Software 422 may also reside, completely or at least partially, within main memory 404 and/or within processing device 402 during execution thereof by computer system 400, main memory 404 and processing device 402 also constituting machine-readable storage media. The software may further be transmitted or received over network 420 via network interface device 416.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A method comprising:
creating a protection switching domain having a control virtual local area network (vlan), a first set of one or more protected data vlans, and a second set of one or more protected data vlans;
detecting a fault in a ring network, the ring network having a master node connected to at least one transit node, each node linked to an adjacent node by at least one of a primary port or a secondary port, the fault indicating a failed link between adjacent nodes;
communicating the fault to the master node via the control vlan;
for the one or more protected data vlans of the first set:
unblocking the master node's secondary port to traffic of at least one data vlan of the first set;
setting a state of the ring network for the first set of data vlans to failed;
flushing a forwarding database on the master node and on the at least one transit node; and
setting the state of the ring network for the first set of data vlans to complete; and
for the one or more protected data vlans of the second set, queuing domain events of the data vlans(s) of the second set until the state of the ring network for the first set of data vlans is set to complete.

2. The method of claim 1, wherein the first set of protected data vlan(s) includes priority data indicating a higher priority that the second set of protected data vlan(s).

3. The method of claim 1, wherein the first set of protected data vlan(s) comprises less data vlans than the second set of protected data vlan(s).

4. The method of claim 1, wherein the protection switching domain comprises an Ethernet Automatic Protection Switching (EAPS) domain.

5. The method of claim 4, wherein detecting the fault comprises the master node polling the ring network to determine whether the ring network is complete.

6. The method of claim 1, wherein the protection switching domain comprises an Ethernet Ring Protection Switching (ERPS) domain.

7. A system comprising:
a memory to store a forwarding database; and
a network controller to:
create a protection switching domain having a control virtual local area network (vlan), a first set of one or more protected data vlans, and a second set of one or more protected data vlans;
detect a fault in a ring network, the ring network having a master node connected to at least one transit node, each node linked to an adjacent node by at least one of a primary port or a secondary port, the fault indicating a failed link between adjacent nodes;

communicate the fault to the master node via the control vlan;

for the one or more protected data vlans of the first set:
unblock the master node's secondary port to traffic of at least one data vlan of the first set;
set a state of the ring network for the first set of data vlans to failed;
flush the forwarding database on the master node and on the at least one transit node; and
set the state of the ring network for the first set of data vlans to complete; and for the one or more protected data vlans of the second set, queue domain events of the data vlans(s) of the second set until the state of the ring network for the first set of data vlans is set to complete.

8. The system of claim 7, wherein the first set of protected data vlan(s) includes priority data indicating a higher priority that the second set of protected data vlan(s).

9. The system of claim 7, wherein the first set of protected data vlan(s) comprises less data vlans than the second set of protected data vlan(s).

10. The system of claim 7, wherein the protection switching domain comprises an Ethernet Automatic Protection Switching (EAPS) domain.

11. The system of claim 10, wherein detecting the fault comprises the master node polling the ring network to determine whether the ring network is complete.

12. The system of claim 7, wherein the protection switching domain comprises an Ethernet Ring Protection Switching (ERPS) domain.

13. A non-transitory machine-readable storage medium having computer executable instructions stored thereon that, when executed, cause a processor to perform a method comprising:

creating a protection switching domain having a control virtual local area network (vlan), a first set of one or more protected data vlans, and a second set of one or more protected data vlans;

detecting a fault in a ring network, the ring network having a master node connected to at least one transit node, each node linked to an adjacent node by at least one of a primary port or a secondary port, the fault indicating a failed link between adjacent nodes;

communicating the fault to the master node via the control vlan;

for the one or more protected data vlans of the first set:
unblocking the master node's secondary port to traffic of at least one data vlan of the first set;
setting a state of the ring network for the first set of data vlans to failed;
flushing a forwarding database on the master node and on the at least one transit node; and
setting the state of the ring network for the first set of data vlans to complete; and for the one or more protected data vlans of the second set, queuing domain events of the data vlans(s) of the second set until the state of the ring network for the first set of data vlans is set to complete.

14. The machine-readable storage medium of claim 13, wherein the first set of protected data vlan(s) includes priority data indicating a higher priority that the second set of protected data vlan(s).

15. The machine-readable storage medium of claim 13, wherein the first set of protected data vlan(s) comprises less data vlans than the second set of protected data vlan(s).

16. The machine-readable storage medium of claim 13, wherein the protection switching domain comprises an Ethernet Automatic Protection Switching (EAPS) domain.

17. The machine-readable storage medium of claim 16, wherein detecting the fault comprises the master node polling the ring network to determine whether the ring network is complete.

18. The machine-readable storage medium of claim 13, wherein the protection switching domain comprises an Ethernet Ring Protection Switching (ERPS) domain.

* * * * *